United States Patent Office 3,507,258
Patented Apr. 21, 1970

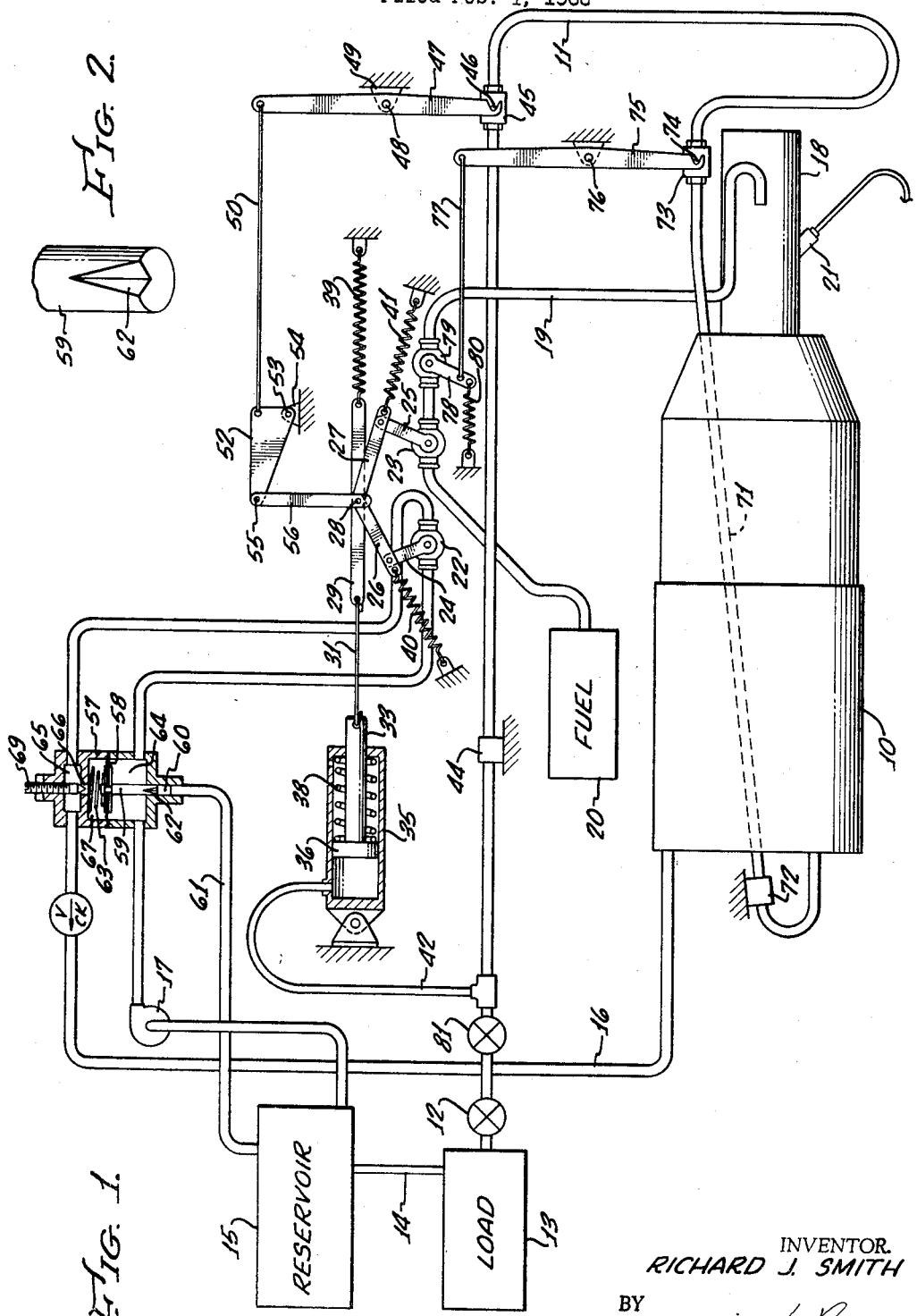

3,507,258
VAPOR GENERATOR CONTROL
Richard J. Smith, 8591 Pyle Way,
Midway City, Calif. 92655
Filed Feb. 1, 1968, Ser. No. 702,380
Int. Cl. F22b *35/00, 37/42;* F22d *5/28*
U.S. Cl. 122—448                                         14 Claims

ABSTRACT OF THE DISCLOSURE

A vapor generator control that includes a sensor that detects vapor pressure and controls the supply of heat and liquid to the generator to maintain desired pressure, a sensor that detects vapor temperature and varies the proportions of heat and liquid to the generator to maintain a desired vapor temperature, and safety devices to interrupt the heat flow if excess temperature occurs and to relieve pressure in the event of overpressurization.

BACKGROUND OF THE INVENTION

Field of the invention

This invention relates to the control of a vapor generator in a liquid-vapor power system.

The prior art

The once-through steam generator, often referred to as the flash boiler, was developed over two hundred years ago, offering the promise of lighter weight, smaller size and lower cost for its capacity than any other type of steam generator. Its potential was never realized, however, because of problems in controlling this type of steam generator under actual operating conditions. The requirement, frequently unrecognized, is to regulate the supply of heat and water to the generator so as to maintain a desired temperature and pressure in the steam produced regardless of the conditions to which the system is subjected. Also, safety devices are needed to prevent failures from overheating or overpressurization. Prior controlling devices fell far short of accomplishing this.

Load fluctuations have a pronounced effect upon the required output of the steam generator. Variations in the heat content of the fuel supplying the burner of the generator, and changes in flow rate of the fuel, occasioned by alterations in its viscosity or otherwise, have a bearing upon the output of the generator. Atmospheric changes in temperature, density and relative humidity also affect the functioning of the system. Other important variables include the temperature of the water being fed into the generator and changes in pressure at the feedwater pump. Differences in heat transfer rates at the heating surfaces of the generator also may occur. All of these factors must be taken into account if the system is to be controlled so as to maintain selected outlet temperature and pressure.

Once-through steam geneartors, with their ability to produce steam rapidly along with their other advantages, were looked upon as a potentially feasible answer to the power generation requirements of the once-prevalent steam vehicles. The failure of such vehicles to survive can be traced to an inability to effectively control the steam systems they used. In early steam vehicles, manual controls were used, confronting the operator with a complex array of valves and levers to be manipulated. Load changes in the vehicle operation caused rapid fluctuation in pressure, and with other conditions also subject to wide variation it was difficult to operate the system effectively, and impossible to maintain a balanced condition.

In view of this, some automatic controls were added to the systems, but these were founded upon an apparent lack of recognition of the basis of the control problems and failed to produce a workable solution. Hence, these early controls were inadequate and could not maintain desired temperatures and pressures throughout the range of operating conditions. They were not able to provide a response sensitive enough to prevent overruns beyond desired operating limits, nor did they take into account all of the factors for which compensation must be made if a balanced system is to be provided.

One of the more advanced pioneers, Leon Serpollet, based his control upon maintaining a high temperature in the boiler tubes and introducing water into these tubes when steam was required. This was effected by a pump for the boiler feedwater, which was actuated when the steam pressure fell and stopped when the desired pressure was reached. However, if the load on the generator was removed when the pressure was up, the pressure then would continue to rise due to the excess heat remaining in the tubes. A pressure-relief device then would discharge the water from the tubes back to the feed supply. This water again would have to be pumped back into the tubes on the next demand for steam at a great expense of power, which drastically detracted from the available net power for the load as well as reducing the efficiency of the system. A surge accumulator was devised, which reduced the power loss, but the system, nevertheless, allowed the abnormal condition to occur before any corrective measures were taken, rather than maintaining the system pressure within acceptable limits.

Other early efforts centered around the control of the feedwater supply to, in turn, control the steam temperature. This was unsatisfactory because of the delay inherently present in the feedback loop. Under conditions of rising steam temperature, feedwater would be introduced into the boiler to lower the temperature. This water could flow through the tubes of the boiler a considerable distance before the temperature sensors would detect a resulting temperature drop. By then, shutting down the feedwater flow would not prevent an overrun, with a consequent sharp drop in temperature and pressure in the system, and a long delay in the production of adequate steam. Thus, the control was not responsive.

In other systems, extremely heavy components, including steel tubes with very thick walls, were used in the steam generator to enable them to withstand extreme temperatures for which there was no effective control. The temperature of the output steam then was reduced to usable levels by injecting water into the outlet when excessive temperatures had been reached. Again, therefore, there was no correction in advance of the abnormal condition, and the system was penalized by the inclusion of the heavy, bulky components and lowered efficiency of steam generation.

Presently, once-through steam generators have found use in steam plants for generating electric power. Here, however, the control function is simplified because of the substantially constant output needed in such power generation, nad the relative uniformity in operating conditions. Even so, extremely elaborate control systems are required, continuously monitored by computers and highly specialized technical personnel.

SUMMARY OF THE INVENTION

The present invention provides a truly balanced control system, sensitive to variations in pressure and temperature and which automatically compensates for all other factors affecting the generator output. A steam generator will operate in perfect equilibrium if the heat input rate is constant, the water flow rate is constant and in proportion to the heat input so as to provide the temperature and pressure desired, and the load is equal to the steam output. In reality, such a condition never exists. The present invention provides a means to bring a steam system continually into balance, compensating for all variations in operating conditions so that at any instant the operation is analogous to a condition of equilibrium. This is accomplished by means of sensors controlling both feedwater input and the heat input to the steam generator. One portion of this will decrease the heat supply to the generator and proportionately decrease the amount of feed-water to the generator upon an increase in pressure in the steam outlet. This reduces the capacity to generate steam and causes the pressure to be brought to a normal value. In this manner, compensation is provided for load variation. Another sensor is responsive to temperature in the steam outlet and will decrease the amount of heat input to the generator, and may increase the volume of feedwater flow as the temperature rises. As a result, the steam outlet is maintained at a correct temperature. The compensates for variations in the fuel, air, water and heating surface heat transfer rate. In addition, as a safety device, an overheat sensor will interrupt the flow of heat to the generator in the event that the internal temperature should reach an unsafe value in view of malfunction of the other system components or an insufficient flow of water. Also, a pressure-relief valve will exhaust in the event that pressures should become excessive.

As the invention is described herein it is used as a control for a steam system. However, it will function also as a control for other liquid and vapor systems, not being limited to steam. The principles for steam control are applicable as well to other fluids.

An object of this invention is to provide an improved control system for a vapor generator in a vapor-liquid system.

Another object of this invention is to provide a control arrangement for a vapor-liquid power system which compensates for variations in load, atmospheric condition, fuel, fluid temperature and heating surface heat transfer coefficient.

A further object of this invention is to provide a control system for a vapor generator in a vapor-liquid power system, which will provide a continual balance of outlet temperature and pressure despite variations in load and operating conditions.

An additional object of this invention is to provide a vapor generator control system which is sensitive and responsive, and will correct for changing conditions before abnormal operation is reached.

Yet another object of this invention is to provide a vapor-liquid power system control of such high response that the components of the vapor generator may be made from relatively thin-gauge, lightweight materials in view of the absence of abnormal temperatures and pressures.

A still further object of this invention is to provide a control system for a vapor generator which will assure that the generator has full vapor-generating capacity under all conditions.

An additional object of this invention is to provide an improved control for a once-through steam generator (flash boiler).

These and other objects will become apparent from the following detailed description taken in connection with the accompanying drawing.

BRIEF DESCRIPTION OF THE DRAWING

FIGURE 1 is a schematic view of the invention as used in controlling a steam generator; and FIGURE 2 is an enlarged fragmentary perspective view of the end of the bypass control pin in the differential pressure valve.

DESCRIPTION OF THE PREFERRED EMBODIMENT

Illustrated in FIGURE 1 of the drawing is a schematic representation of a typical steam system such as may be used in a vehicle or for other purpose. It includes a steam generator 10, which may be of any kind as the system of this invention can be used to control all varieties of steam generators. The need for a control system as provided by this invention, however, exists in particular for once-through or flash-type steam generators. The steam generator 10 delivers steam through an outlet line 11 and a throttle 12 to the load 13. A closed system is shown in which water is returned through line 14 to a reservoir tank 15. Feedwater is delivered to the generator 10 through the line 16 in response to the operation of a pump 17. A burner 18 supplies heat to the steam generator and receives fuel through a line 19 leading from a tank 20. An ignition device 21 is included at the burner.

A control valve 22 is placed in the feedwater line 16, while a similar control valve 23 is in the fuel inlet line 19 that leads to the burner 18. The valves 22 and 23 are operated by arms 24 and 25, respectively. The two valves 22 and 23 are arranged so that they are shut off by rotation of their actuating arms 24 and 25, respectively, in the clockwise direction as the device is illustrated. Links 26 and 27 connect to the ends of the arms 24 and 25 and converge to a pivot pin 28 that connects also to a member 29. The latter member is connected to one end of a tension link 31 that at its opposite end connects to a piston rod 33. The rod 33 extends into a cylinder 35 to a piston 36. A spring 38 in the cylinder 35 biases the piston 36 to the left as the system is shown. A lighter tension spring 39 engaging the member 29 pulls that member to the right. In addition, there are tension springs 40 and 41 pulling outwardly on the links 26 and 27.

The cylinder 35, at the end opposite from the spring 38, connects through a line 42 to the outlet line 11 leading from the steam generator. Thus, there is present in the cylinder 35 the maximum steam pressure in the system. This arrangement, therefore, is sensitive to the system's steam pressure and will adjust the supply of fuel and the feedwater to compensate for variations beyond the normal values of the steam pressure.

In the event that the steam pressure in the system builds up to a predetermined point, it will produce a sufficient force on the piston 36 to displace the piston to the right as the device is shown against the opposing force of the spring 38. This releases the link 31 so that the tension spring 39 draws the member 29 to the right. This movement, through the link 27, and with the assistance of spring 41, rotates the valve arm 25 in the clockwise direction. As a result, the valve 23 is moved toward the closed position, cutting down on the flow of fuel through the line 19 to the burner 18.

At the same time, as the member 29 is moved to the right, it pulls on the link 26. This causes the valve arm 24 to turn, also in the clockwise direction. Consequently, the valve 22 in the feedwater line 16 also is moved toward the closed position. This reduces the supply of water to the steam generator 10. If the pressure becomes sufficiently high, both the valves 22 and 23 will be shut off.

The effect of decreasing the quantity of fuel fed to the burner 18 as the valve 23 is moved toward its closed position is to reduce the amount of heat produced and supplied to the steam generator. Therefore, the amount of steam is decreased, as the production of steam is directly dependent upon the supply of heat. This reduction in the generation of steam lowers the outlet pressure in line 11, lowering the pressure of the steam fed to the load 13.

At the same time that the generator heat input is being reduced, the amount of water supplied to the steam generator also is being diminished. This cuts down on the ability of the steam generator to produce steam, which must come from the water that is supplied to it. Again, therefore, the system pressure is reduced as the quantity of steam generated becomes less. Thus, both feedwater and boiler heat are controlled simultaneously by this arrangement for maintaining an established pressure in the steam system. This gives almost instantaneous compensation for variations in the load on the steam system.

The controls are worked oppositely when pressure in the outlet line 11 falls. In that event, the piston 36 moves to the left as the spring 38 overcomes the reduced steam pressure in the cylinder 35. This causes the linkage to move the valve arms 24 and 25 in a counterclockwise direction, increasing the flow of water and the supply of heat to the steam generator 10. This enables the generator to produce additional steam to raise the system pressure.

A control of steam system temperature is superimposed on the pressure control and utilizes the same valves 22 and 23 in the water and fuel lines. In accomplishing this, a straight portion of the steam outlet line 11 is anchored by a bracket 44 to fixed structure. Upstream of the bracket 44 is a member 45 connected to the exterior of the line 11, which, through a pin 46, engages one end of a lever 47. The latter member is pivoted by a pin 48 about a fixed bracket 49 and connects at its opposite end to a link 50. The link 50 extends to the midportion of a crank 52 above a pivot pin 53, where, by a bracket 54, the crank is mounted on fixed structure. The horizontal arm of the crank 52 connects through pin 55 to a vertical link 56. The bottom end of the link 56 connects through the pivot pin 28 to the members 26, 27 and 29.

When the temperature in the system rises, the line 11 expands. This provides an elongation in the section of the line 11 between the fixed bracket 44 and the member 45 that connects, through pin 46, to the lever 47. The expansion, therefore, will move the member 45 to the right as the device is shown, causing the lever 47 to experience counterclockwise rotation about the pivot pin 48. This releases the link 50 so that it frees the crank 52 for counterclockwise rotation about its pivot pin 53. Therefore, the vertical link 56 is allowed to move downwardly and the links 26 and 27 are moved outwardly by the springs 40 and 41. This causes both of the links 26 and 27 to push on the valve arms to which they are connected. The link 26 turns the arm 24 in the counterclockwise direction so that the valve 22 is opened up further. On the other hand, when the link 27 pushes on the valve arm 25, the fuel valve 23 is rotated clockwise and moved toward the closed position. In practice, the linkage is adjusted so that the decrease in fuel flow is relatively slight as the temperature is increased, while the increase in water flow is somewhat larger.

This arrangement means that, as temperature increases, the amount of fuel supplied to the burner is reduced. Therefore, the heat to the steam generator is decreased and the amount of steam produced likewise is reduced. This lowers the temperature in the system. At the same time, as the valve 22 is opened further, the amount of water supplied to the steam generator becomes greater. This dilutes the steam generator with the cooler inlet water so that again the temperature is reduced. Therefore, rising temperature conditions cause a compensating effect to reduce the temperature in the steam outlet. This is done while utilizing a portion of the same linkage that is sensitive to the pressure conditions and also through operating the same control valves as are used in correcting for pressure variations. The temperature and pressure compensating systems may modify each other while responding to fluctuating conditions. In both, the response is very rapid.

Decreasing temperature in the steam outlet line is compensated for in the same manner as the components are shifted in the opposite direction. The valve 23 then is moved toward the open position so that fuel flow and generator heat input are increased, thereby causing an increase in the temperature of the steam produced and counteracting the temperature reduction in the steam outlet. Simultaneously, the valve 22 is actuated to restrict the feedwater flow in the line 16. This reduces the supply of liquid to the steam generator 10 so that the generator is able to raise the temperature of the steam it generates, correcting for the decrease that had occurred in the temperature of the outlet steam. Water and fuel flow are controlled complementarily, as before, in producing the compensating effect.

Under some circumstances, where speed and load remain constant, an effective control of the system can be accomplished by controlling the fuel alone. However, in most systems there is enough variation in the operating conditions to require feedwater control for satisfactory results. The reduction of burner heat resulting from a decreased fuel supply, without an accompanying decrease in water flow, reduces the temperature in the system and lowers the quality of the steam.

Variations in pressure at the feedwater pump 17 are controlled by the differential pressure valve 57, which maintains a constant pressure drop across the control valve 22 in the feedwater line 16. This valve includes a diaphragm 58 carrying a metering pin 59 that extends to the entrance 60 to a bypass line 61 that connects to the water reservoir 15. The metering pin 59 includes a V-shaped notch 62 in its outer end to allow increasing flow through the bypass 61 as the metering pin 59 is pulled outwardly of the entrance to the bypass. A compression spring 63 biases the diaphragm 58 in the direction in which the metering pin closes the entrance 60 to the bypass 61.

The control 57 is positioned in the line 16 such that the chamber 64 on the side of the diaphragm 58 that includes the metering pin 59 is upstream of the control valve 22. Downstream of the valve 22 is a passageway 65 through the valve 57, connecting through an opening 66 to a chamber 67 on the opposite side of the diaphragm 58. When the pin 59 is extended into the bypass entrance 60, all the water from the pump 17 will flow through the chamber 64, the valve 22 and the passageway 65 to be fed to the steam generator 10. However, in the event that the pressure in the chamber 64 exceeds that in the chamber 67 by a predetermined value, the diaphragm 58 will be moved against the force of the spring 63 to move the pin 59 out of the bypass entrance 60. Consequently, the notch 62 is opened and some of the water from upstream of the valve 22 then can bypass through the line 61 back to the reservoir 15. The amount of bypass flow is governed by the travel of the pin 59 away from the bypass opening, as its contoured end opens up a larger passageway as the pin is moved a greater distance.

This arrangement will maintain a constant pressure drop across the control valve 22. Any flow which would tend to increase this pressure drop is bypassed through the line 61 back to the reservoir, while a reduction in pressure drop will reduce the bypass flow. If the valve 22 should be moved toward the closed position, pressure will build up in the chamber 64 so that the bypass will open and the excess water will be returned to the reservoir 15. Similarly, if the speed of the pump 17 should increase so that it produces a greater flow, again the pressure will increase in the chamber 64 relative to that in the chamber 67, and the bypass will open. Flooding the generator 10 with too much feedwater is avoided. Conversely, the bypass closes as the pressure in the chamber 64 decreases with respect to that on the other side of the diaphragm 58, thereby allowing a greater percentage of the pump output to be conducted through the line 16 to the steam generator 10. The steam generator, therefore, can continue to receive adequate feedwater as may be needed, even when the feedwater pump 17 slows down.

If desired, a throttling pin 69 may be included at the entrance 66 to the chamber 67 in the valve 57. The pin 69 has a conical end and is adjustable axially by being threaded to the valve body to control the area of the opening into the chamber 67. The purpose of the restriction provided by the pin 69 is to smooth out pulsations in the feedwater flow. The feedwater pump 17 may be a positive displacement type producing flow in repeated incremental pulses. This would cause the diaphragm 58 to flutter continually and rapidly as pressure differentials occurred across the diaphragm. With a restriction in the opening 66, the pulses are smoothed out and the diaphragm movement is damped.

An emergency shutoff of the fuel also may be included as a precautionary measure. This is to shut down the generator heat input in the event of malfunction of the normal temperature control system or water supply insufficiency. The safety fuel shutoff operates off the expansion of the hottest coil in the steam generator. In the embodiment shown, this is the coil 71 which is anchored by a bracket 72 that is mounted on fixed structure. A member 73 carried by the tube 71 exteriorly of the generator engages by a pin 74 the lower end of a lever 75. The latter member is pivoted about a pin 76 and at its upper end connects to a link 77. The actuating arm 78 of a shutoff valve 79 in the fuel line 19 connects to the link 77. The valve arm 78 is biased in a clockwise direction, which is toward the closed position of the valve 79, by a tension spring 80. The lever 75 is shorter between the pivot pin 76 and the pin 74 than it is between the pivot pin 76 and the link 77. Thus expansion of the steam tube 71 is reflected in amplified movement of the link 77.

In the event of an overheat condition, the steam tube 71 expands so that the member 73 through the pin 74 will release the lever 75 for rotation in the counterclockwise direction. This moves the valve 79 to the closed position, shutting off all fuel to the burner. Of course, the system is adjusted so that this shutoff of the fuel supply will occur only at a temperature above that at which the normal regulation accomplished by that of the steam line 11 takes place.

The safety overheat control operates off the hottest boiler tube in order that it may detect a potentially destructive overheat condition at the location of maximum vulnerability. This will shut off the generator heat under all conditions of excess heating, even in the event no steam is flowing in the system. The normal temperature control, on the other hand, relies upon the condition in the outlet line 11, exteriorly of the steam generator 10. This gives a true representation of the condition of the steam delivered to the load 13. The temperature of the tube 71 may be influenced by the fire from the burner 18, so that its temperature is not exactly the same as that of the outlet steam.

A pressure-relief valve 81 also is included in the steam line 11 to guard against the generation of excess pressure if the normal pressure control should fail.

From the foregoing it can be seen that, regardless of what variations there may be in the operating conditions of the system, there is a provision to compensate for it and immediately apply a correcting factor. Fluctuations in temperature and pressure in the system cause the water and steam control valves to be adjusted to properly control the amount of feedwater and fuel being supplied. By operating off the system temperatures and pressures, variations caused by changes in atmospheric condition, heat content or flow rate of the fuel, heat transfer coefficient at the generator, or the like automatically are taken care of. The flow of water and fuel will be controlled until the proper values of heat and pressure are reached, regardless of other factors. Moreover, fluctuations in the feedwater input are controlled by the differential pressure valve in the water inlet line. Complete safety is assured by the overtemperature control associated with the steam generator that will shut the system down in the event of excessive heat at the hottest portion of the steam system.

The system enables the burner to always have a maximum amount of combustion without overheating or overpressurizing. This assures that the burner provides sufficient heat so that it maintains an ability to produce steam immediately upon demands imposed by increased loading on the system. The control makes certain that the system will not be confronted with situations when it is supplied with an insufficient amount of steam.

The control arrangement is quite sensitive, and it will maintain the proper temperatures and pressures in the system without undesirable overruns and fluctuations. By avoiding any extreme conditions, the system components may be designed realistically to meet a known design range of operating conditions rather than conditions far beyond such range, as is required in conventional systems where extremes are not avoided. The steam generator may have very thin-walled tubes because it will never become overheated. This permits it to be lighter and cheaper, and to provide for faster and more efficient generation of steam. The control system of this invention, therefore, not only assures that the load will be properly supplied with steam under all operating conditions, but also allows other components of the system to be of more efficient design and operation.

The invention has been shown and described as actuated by a mechanical system. It is not limited to such operation, however, and may take other forms in controlling the output of the generator. For example, an electrical system may include pickups to sense the change in temperature and pressure and cause the necessary corrective functions to take place.

The foregoing detailed description is to be clearly understood as given by way of illustration and example only, the spirit and scope of this invention being limited solely by the appended claims.

What is claimed is:

1. In combination with a vapor-liquid power system including a vapor generator, a source of heat for said generator, and means for conducting fluid to said generator for the production of vapor, a control arrangement comprising means responsive to the pressure of vapor produced by said generator for controlling the mount of heat supplied to said generator by decreasing the amount of heat supplied to said generator upon an increase in said pressure and increasing the amount of heat supplied to said generator upon a decrease in said pressure, said means responsive to pressure including a chamber, means for conducting to said chamber vapor produced by said generator, a member in said chamber movable in response to the pressure of said vapor in said chamber, and means connecting said member to said source of heat for effecting the control thereof, and means responsive to the temperature of vapor produced by said generator for controlling the amount of heat supplied to said generator by decreasing the amount of heat supplied to said generator upon an increase in temperature and increasing the amount of heat supplied to said generator upon a reduction in said temperature, said means responsive to temperature including a heat-expansible member, and means connecting said heat-expansible member to said source of heat for effecting the control thereof, 2. In combination with a steam-liquid power system including a steam generator, a burner for said steam generator, means for conducting fuel to said burner, said means for conducting fuel to said burner including a first conduit connected to said burner, an outlet for conducting steam from said generator, and means for conducting water to said generator for conversion to steam, said means for conducting water to said generator including a second conduit connected to said generator, a control arrangement for said system comprising a first valve in said first conduit for controlling the flow therethrough, a second valve in said second conduit for controlling the flow therethrough,
    said valves being in spaced adjacency,
    said first and second valves having first and second valve arms, respectively, for actuating the same, said valve arms being rotatable in the same direction for moving said valves toward an open position,
a first link connected to said first valve arm,
a second link connected to said second valve arm,
    said links inclining toward each other at the outer ends thereof,
a member interconnecting said first and second links at said outer ends thereof,
means responsive to pressure in said outlet connected to said member for moving said member laterally relative to said valves in one direction in response to an increase in pressure in said outlet for so rotating said valve arms in said one direction to move said valves toward said closed positions thereof for decreasing thet flow of fuel to said burner and decreasing the flow of water to said steam generator upon an increase in pressure in said outlet,
a second member interconnecting said first and second links at said outer ends thereof intermediate said valves,
    said second member being movable inwardly toward said valves to cause said first link to move said first valve arm in said one direction and said second link to move said second valve arm in the opposite direction,
and means responsive to temperature in said outlet connected to said second member for so moving said second member inwardly upon an increase in temperature in said outlet for decreasing the flow of fuel to said burner and increasing the flow of water to said steam generator upon an increase in temperature in said outlet.

3. In combination with a vapor-liquid power system including a vapor generator, a burner for said generator, means for conducting fuel to said burner, an outlet for conducting vapor from said generator, and means for conducting liquid to said generator for conversion to vapor, a control arrangement for said system comprising a chamber,
    means connecting said chamber to said outlet of said generator for conducting pressurized vapor from said generator to said chamber,
    pressure-responsive means in said chamber,
        said pressure-responsive means being movable in one direction in response to an increase in the pressure of said vapor, and movable in another direction in response to a decrease in the pressure of said vapor,
    a first valve means in said means for conducting fuel to said burner,
        said first valve means being movable toward a closed position for decreasing the flow of fuel to said burner, and toward an open position for increasing the flow of fuel to said burner,
    a second valve means in said means for conducting liquid to said generator,
        said second valve means being movable toward a closed position for decreasing the flow of liquid to said generator, and toward an open position for increasing the flow of liquid to said generator,
    and means connecting said pressure-responsive means to said first and second valve means for simultaneous movement of said first and second valve means toward said closed positions thereof upon movement of said pressure-responsive means in said one direction, and simultaneous movement of said first and second valve means toward said open positions thereof upon movement of said pressure-responsive means in said other direction.

4. A device as recited in claim 3 including in addition means responsive to the temperature of said vapor in said outlet,
and means connecting said temperature - responsive means to said first and second valve means for moving said first valve means toward said closed position thereof and said second valve means toward said open position thereof upon an increase in temperature in said outlet, and moving said first valve means toward said open position thereof and said second valve means toward said closed position thereof upon a decrease in temperature in said outlet.

5. A device as recited in claim 4 in which
each of said first and second valve means includes an actuating member operable for said movement of said valve means toward said open and closed positions,
said temperature-responsive means includes a vapor-conducting conduit which will expand in length upon an increase in temperature in said outlet and contract in length upon a decrease in temperature in said outlet,
and including a linkage connecting said conduit to said actuating members of said first and second valve means for operation of said actuating members and effecting said movements of said valve means upon increase and decrease in temperature in said outlet.

6. A device as recited in claim 5 in which
said first and second valve means are in spaced adjacency,
said linkage including a first link extending from said actuating member of said first valve means,
a second link extending from said actuating member of said second valve means,
means interconnecting said first and second links at a location intermediate said valve means,
and means for moving said interconnecting means for causing said first and second links to simultaneously move said actuating members.

7. A device as recited in claim 6 including in addition a member extending from said pressure-responsive means to said first and second links for simultaneously moving said first and second links upon movement of said pressure-responsive means.

8. A device as recited in claim 7 in which
said actuating members are rotatable in the same direction for moving said first and second valve means toward said open positions,
and rotatable in the opposite direction for moving said first and second valve means toward said closed positions,
said first and second links being connected at an obtuse angle,
said means for moving said interconnecting means being movable generally transversely to said first and second links for thereby simultaneously rotating said actuating members in opposite directions.

9. A device as recited in claim 8 including
means movable by said pressure-responsive means in a direction generally longitudinally of said first and second links and connected to said interconnecting means for thereby simultaneously moving said actuating members in the same direction.

10. A device as recited in claim 4 including in addition means for providing a substantially constant pressure drop across said second valve means.

11. A device as recited in claim 10 in which said means for providing a substantially constant pressure drop across said second valve means includes
a bypass for diverting liquid away from said generator,
a first chamber upstream of said second valve means,
a second chamber downstream of said second valve means, a pressure-responsive member intermediate said chambers and responsive to pressures in said chambers, a passageway connected to said first chamber, and means operated by said pressure-responsive member for regulating the flow in said passageway to increase the flow in said passageway upon an increase in pressure in said first chamber relative to the pressure in said second chamber, and to decrease the flow in said passageway upon a decrease in pressure in said first chamber relative to the pressure in said second chamber.

12. A device as recited in claim 4 in which said generator includes conduit means for conducting liquid through said generator to receive heat from said burner and provide heated vapor, said conduit means including a portion subjected to maximum temperature within said generator, and including means responsive to the temperature of said portion of said conduit means for shutting off the supply of fuel to said burner upon achieving a predetermined temperature in said portion of said conduit means.

13. A device as recited in claim 12 in which said means for shutting off the supply of fuel to said burner includes a third valve means in said means for conducting fuel to said burner, means for anchoring one part of said portion of said conduit means, whereby said portion of said conduit means is expansible relative to said anchoring means in response to increased temperatures in said generator, and linkage means connected to said portion of said conduit means remote from said anchoring means and to said third valve means for moving said third valve means to a closed position upon a predetermined expansion of said portion of said conduit means.

14. A device as recited in claim 13 in which said linkage means is connected to said portion of said conduit means exteriorly of said generator.

References Cited

UNITED STATES PATENTS

| | | | |
|---|---|---|---|
| 1,955,274 | 4/1934 | Doble. | |
| 2,292,023 | 8/1942 | Dickey | 122—504 |
| 3,164,136 | 1/1965 | Laubli | 122—479 |

CHARLES J. MYHRE, Primary Examiner

U.S. Cl. X.R.

122—451, 504